(12) United States Patent
Wu et al.

(10) Patent No.: US 8,873,905 B2
(45) Date of Patent: Oct. 28, 2014

(54) RECONFIGURABLE OPTICAL ADD-DROP MULTIPLEXER

(75) Inventors: Ming Wu, Pleasanton, CA (US); Peter G. Wigley, Corning, NY (US)

(73) Assignee: II-VI Incorporated, Saxonburg, PA (US)

( * ) Notice: Subject to any disclaimer, the term of this patent is extended or adjusted under 35 U.S.C. 154(b) by 195 days.

(21) Appl. No.: 13/411,487

(22) Filed: Mar. 2, 2012

(65) Prior Publication Data

US 2012/0163825 A1     Jun. 28, 2012

Related U.S. Application Data

(63) Continuation-in-part of application No. 12/927,066, filed on Nov. 5, 2010, now Pat. No. 8,755,651, which is a continuation-in-part of application No. 12/804,627, filed on Jul. 26, 2010, now Pat. No. 8,577,192.

(51) Int. Cl.
    *G02B 6/26*          (2006.01)
    *G02B 6/35*          (2006.01)
    *G02B 6/293*        (2006.01)

(52) U.S. Cl.
CPC .......... *G02B 6/3512* (2013.01); *G02B 6/29313* (2013.01); *G02B 6/3546* (2013.01); *G02B 6/3556* (2013.01); *G02B 6/356* (2013.01)
USPC ......................................................... 385/18

(58) Field of Classification Search
CPC ......................... G02B 6/29383; G02B 6/3512
USPC ......................................................... 385/33
See application file for complete search history.

(56) References Cited

U.S. PATENT DOCUMENTS

| | | | |
|---|---|---|---|
| 4,923,270 | A | 5/1990 | Carter |
| 6,654,157 | B2 | 11/2003 | Islam et al. |
| 6,704,487 | B2 | 3/2004 | Parhami et al. |
| 6,798,551 | B2 | 9/2004 | Gu |
| 6,891,676 | B2 | 5/2005 | Ford et al. |
| 6,992,777 | B2 | 1/2006 | Han et al. |

(Continued)

FOREIGN PATENT DOCUMENTS

| | | |
|---|---|---|
| CN | 1656721 A | 8/2005 |
| CN | 1831574 A | 9/2006 |

(Continued)

OTHER PUBLICATIONS

United States Patent and Trademark Office, Non-Final Rejection, U.S. Appl. No. 12/927,066, Jun. 10, 2013, 18 Pages.

(Continued)

*Primary Examiner* — Eric Wong
(74) *Attorney, Agent, or Firm* — Fenwick & West LLP

(57) ABSTRACT

A reconfigurable optical device including input and output ports, and add or drop ports, has a high degree of flexibility such that any wavelength channel from any optical signal introduced through the add ports may be added to any of the optical signals transmitted through the output ports. In addition, any wavelength channel from any optical signal received through the inputs ports may be dropped through any of the drop ports. Furthermore, the optical device is configurable to allow the same wavelength channel from two different optical signals supplied respectively through any two inputs ports to be simultaneously directed to two different drop ports.

11 Claims, 15 Drawing Sheets

(56) References Cited

U.S. PATENT DOCUMENTS

| | | | |
|---|---|---|---|
| 7,016,098 B2 | 3/2006 | Giles et al. | |
| 7,236,660 B2 | 6/2007 | Ducellier et al. | |
| 7,340,128 B2 | 3/2008 | Shibata et al. | |
| 7,362,930 B2 | 4/2008 | Davis et al. | |
| 7,440,648 B2 | 10/2008 | Oikawa et al. | |
| 7,672,585 B2 | 3/2010 | Sone et al. | |
| 7,720,329 B2 * | 5/2010 | Presley et al. | 385/18 |
| 2001/0038730 A1 | 11/2001 | Sorin et al. | |
| 2002/0005970 A1 | 1/2002 | Lang | |
| 2004/0156581 A1 | 8/2004 | Golub et al. | |
| 2006/0228070 A1 | 10/2006 | Davis et al. | |
| 2006/0257091 A1 | 11/2006 | Tabuchi et al. | |
| 2009/0103861 A1 | 4/2009 | Presley et al. | |
| 2009/0304328 A1 | 12/2009 | Presley et al. | |
| 2010/0150563 A1 | 6/2010 | Nakajima | |
| 2012/0020617 A1 | 1/2012 | Wu | |

FOREIGN PATENT DOCUMENTS

| | | |
|---|---|---|
| CN | 1996075 A | 7/2007 |
| CN | 101384933 | 3/2009 |
| CN | 202339423 U | 7/2012 |
| WO | WO 2007/078415 A2 | 7/2007 |

OTHER PUBLICATIONS

United States Patent and Trademark Office, Non-Final Rejection, U.S. Appl. No. 13/226,275, Jun. 11, 2013, 23 Pages.

The State Intellectual Property Office of the People's Republic of China, Second Office Action, Chinese Patent Application No. 201110210059.X, Mar. 21, 2013, 15 pages.

Patent Cooperation Treaty, Written Opinion of the International Search Authority, International Patent Application No. PCT/US2010/002449, mailed Nov. 2, 2010, 6 pages.

Patent Cooperation Treaty, International Search Report, International Patent Application No. PCT/US2010/002449, mailed Nov. 2, 2010, 2 pages.

Patent Cooperation Treaty, Written Opinion of the International Search Authority, International Patent Application No. PCT/US2011/045424, mailed Dec. 5, 2011, 9 pages.

Patent Cooperation Treaty, International Search Report, International Patent Application No. PCT/US2011/045424, mailed Dec. 5, 2011, 2 pages.

Patent Cooperation Treaty, Written Opinion of the International Search Authority, International Patent Application No. PCT/US2011/059448, mailed Apr. 4, 2012, 4 pages.

Patent Cooperation Treaty, International Search Report, International Patent Application No. PCT/US2011/059448, mailed Apr. 4, 2012, 2 pages.

The State Intellectual Property Office of the People's Republic of China, First Office Action, Chinese Patent Application No. 201110210059.X, mailed Aug. 17, 2012, 17 pages.

The United States Patent and Trademark Office, Final Rejection, United States Patent Application No. 12/804,627, mailed Jan. 31, 2013, 16 pages.

The United States Patent and Trademark Office, Non-Final Rejection, U.S. Appl. No. 12/804,627, mailed May 11, 2012, 20 pages.

* cited by examiner

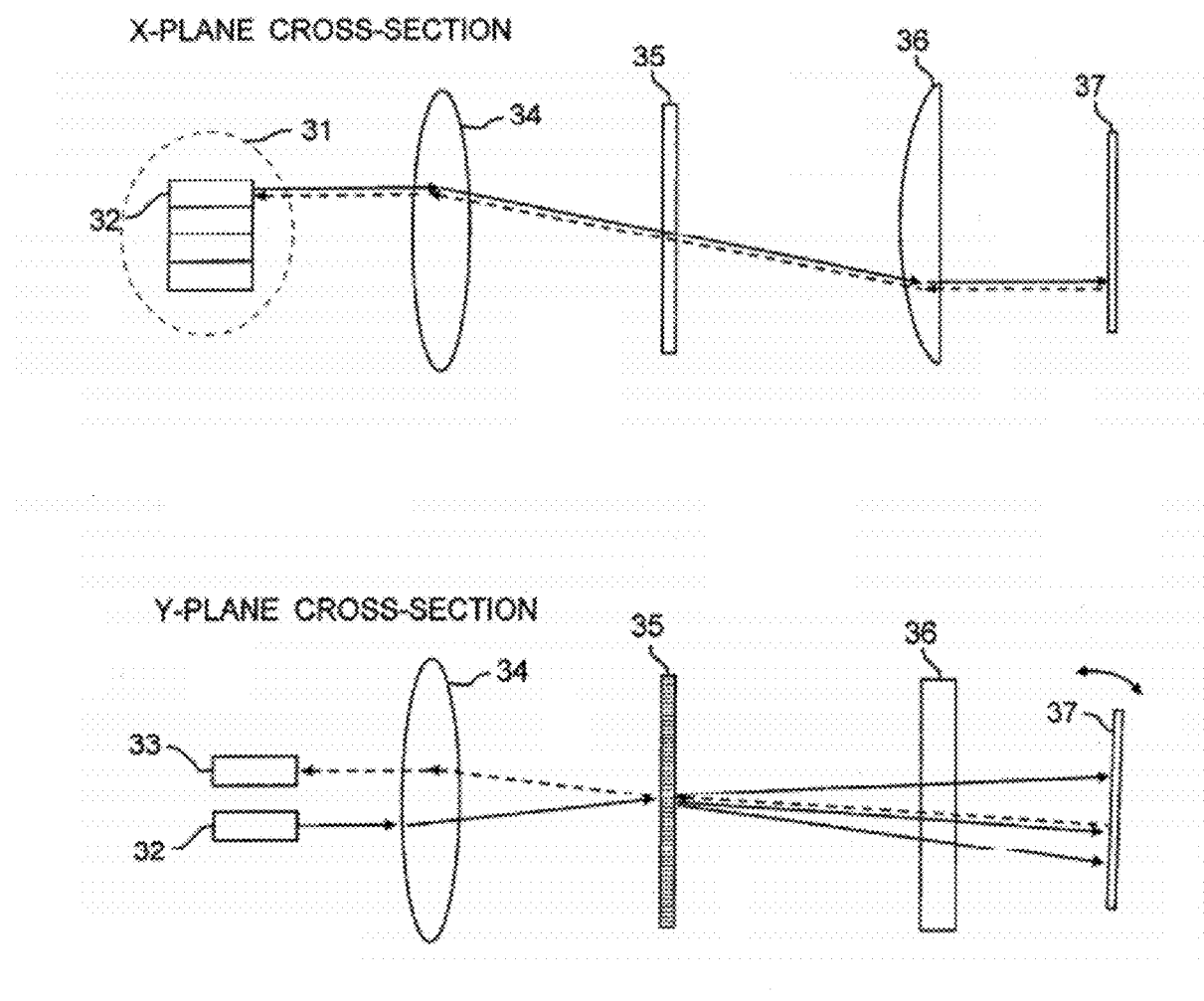

RECONFIGURABLE OPTICAL ADD-DROP MULTIPLEXER

CROSS-REFERENCE TO RELATED APPLICATION(S)

This application is a continuation-in-part of U.S. patent application Ser. No. 12/927,066, filed Nov. 5, 2010, now U.S. Pat. No. 8,755,651 which is a continuation-in-part of U.S. patent application Ser. No. 12/804,627, filed Jul. 26, 2010 now U.S. Pat. No. 8,577,192. The entire contents of both of these applications are incorporated by reference herein.

BACKGROUND

Optical devices that perform optical filtering and can be tuned to select one or more narrow band of wavelengths from a wider wavelength spectrum are known as tunable optical filters. They are used in a variety of optical systems, e.g., wavelength division multiplexed (WDM) systems. In WDM systems that operate typically over wavelength bands of tens of nanometers, tunable optical filters are used for optical performance monitoring (OPM) to ensure that signal power, signal wavelength, and/or signal to noise ratios (OSNR) are within specified limits. Other applications for tunable optical filters include optical noise filtering, noise suppression, wavelength division demultiplexing, and optical routing.

Complex state-of-the-art dense wavelength division multiplexed (DWDM) systems have many channels operating across a wide optical spectrum. Monitoring these channels is a challenge because many measurements are required. A monitoring equipment that reduces the time and complexity of performing these measurements can significantly increase overall system performance and reduce system costs.

SUMMARY OF THE INVENTION

One or more embodiments of the present invention provide a reconfigurable optical device, e.g., a reconfigurable optical add/drop multiplexer (ROADM), that has a high degree of flexibility such that any wavelength channel from any optical signal introduced through add ports may be added to any of the optical signals transmitted through output ports, and any wavelength channel from any optical signal received through inputs ports may be dropped through any of drop ports. The add/drop functionality provided by a ROADM according to one or more embodiments of the present invention can be characterized as colorless, directionless, and contentionless.

An optical device, according to an embodiment of the invention, includes a plurality of drop ports, a plurality of optical filter switches, each coupled to one of the drop ports, and a plurality of splitters, each splitter coupled to the optical filter switches to supply a WDM signal that is received at an input thereof to each of the optical filter switches. In this embodiment, the optical filter switches are configurable to allow any wavelength channel of a WDM signal supplied from any one of the splitters to be directed to any one of the drop ports.

An optical device, according to another embodiment of the invention, includes a plurality of add ports, a plurality of optical filter switches, each coupled to one of the add ports, and a plurality of combiners, each combiner coupled to the optical filter switches to receive a WDM signal therefrom and generate a combined WDM signal. In this embodiment, the optical filter switches are configurable to allow any wavelength channel of an optical signal supplied through any one of the add ports to be directed to any one of the combiners.

A method of adding or dropping wavelength channels to and from optical signals passing through a reconfigurable optical device having an array of filter switches each of which includes a mirror that is rotatable about first and second axes, according to an embodiment of the invention, includes the step of rotating a mirror of one of the filter switches about a first axis to select one of the optical signals and about a second axis to select a wavelength channel in the selected optical signal to be output through a drop port.

A method of adding or dropping wavelength channels to and from optical signals passing through a reconfigurable optical device having an array of filter switches each of which includes a mirror that is rotatable about first and second axes, according to another embodiment of the invention, includes the step of rotating a mirror of one of the filter switches about a first axis to select a wavelength channel corresponding to an optical signal supplied through an add port and about a second axis to select an output port to which the wavelength channel corresponding to the optical signal supplied through the add port is to be directed.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 4B is a schematic illustration of the operation of the tunable multiport optical filter of FIG. 4A, showing ray diagrams for the x- and y-directions of the device;

For clarity, identical reference numbers have been used, where applicable, to designate identical elements that are common between figures. It is contemplated that features of one embodiment may be incorporated in other embodiments without further recitation.

DETAILED DESCRIPTION

Figure 1:
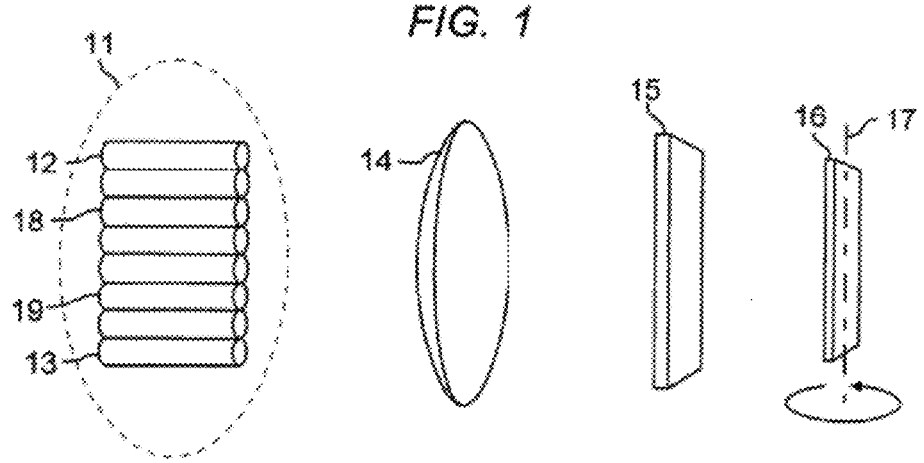
FIG. 1 is a perspective view showing a first embodiment of a tunable multiport optical filter.

FIG. 1 shows a first embodiment of a tunable multiport optical filter with an array of input and optical fibers shown at 11, and with collimating lens 14, dispersive element 15, and tuning mirror 16. The tuning mirror rotates around axis 17. It should be understood that this figure (and subsequent figures) is not drawn to scale. Optical elements are located and spaced according to their functions and properties as known in the art. The description herein uses x- and y- axial notations for directions around the z-axis, which is the direction of light propagation through the device. Reference herein to the x-plane or the y-plane will be understood to mean the x-z or y-z planes. Reference in the figures to the x-axis cross section or the y-axis cross section is intended to mean a view of the x-z plane or the y-z plane respectively.

The embodiments shown are described in the context of OPM applications. However, it should be understood that the basic devices described herein are also useful as wavelength selective devices for routing selected WDM channels.

Figure 2:
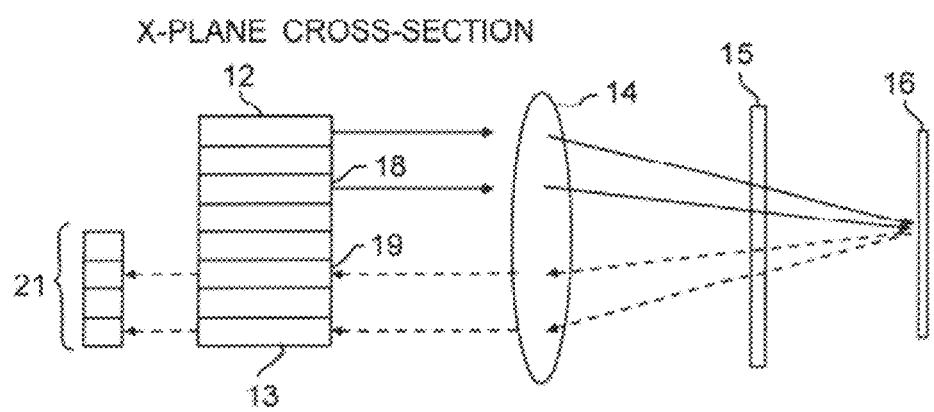
FIG. 2 is a schematic illustration of the operation of the tunable multiport optical filter of FIG. 1, showing ray diagrams for the x- and y-directions of the device.
Figure 2:
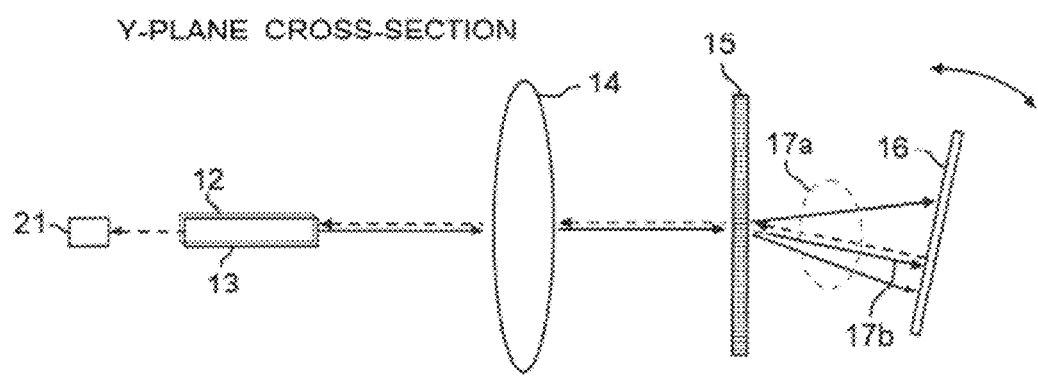

The specific optics as represented by ray optics, for the embodiment of FIG. 1, are illustrated in FIG. 2. The input fiber array 11 is comprised of 8 fibers which are tightly aligned in parallel, i.e., the optical fibers have minimal spacing and are aligned with the centers of the optical fibers on a common axis, as shown the x-axis. The signal beam to be monitored, typically a tapped portion of the signal from one channel of the network, is coupled to input fiber 12. It passes through collimating lens 14 to collimate the Gaussian input beam to collimated light with suitable diameter. The collimated beam is incident onto dispersion element 15. In the x-axis cross section (top portion of FIG. 2) the beam is not dispersed. In the y-axis cross section (bottom portion of FIG. 2) the light beam from dispersion element 15 is dispersed into the wavelength components of the signal beam. The wavelength components 17a are angularly dispersed from the dispersion element in different directions depending on the wavelength of the beam. Tuning mirror 16 is positioned as shown to intersect the dispersed beam, and is rotatable about the x-axis and the y-axis.

The optical fibers are shown only schematically in the figures. Typically they will be standard single mode fibers with a cladding diameter of 125 microns and a core diameter of 10 microns or less. In the portion of the array shown, i.e., the portion addressed by the wavelength selection elements, the optical fibers are stripped of the usual polymer coating. This allows greater precision in the array, producing, in many cases, a predictable spacing between cores of the fibers. Recognizing that a variety of options in the format of the array may be desirable, as will be discussed in greater detail below, optical fibers with sizes other than the conventional 125 microns may be useful. For example, cladding diameters of 50, 62.5, 250, may be used to advantage to vary the overall aperture (size) of the array. It is expected that small aperture arrays may be most cost effective.

Mirror 16 is rotatable about the x-axis into one of many positions. In the example shown in FIG. 2, only one of the beam components (wavelength channels), in this case components represented by arrow 17b, is normal to the mirror 16. That beam component is reflected back along a path represented by the dashed line. Other beam components, like the two shown in the y-axis cross section of FIG. 2, will "walk-off" the mirror 16. The selected beam component, 17b, is dispersed by element 15 by the same angle as before and propagates to output fiber 13. The intensity of beam component 17b is measured by photodiode 21, coupled as shown to the output fiber 13. Input optical fiber 12 is shown in this view just to orient the viewer to the fact that the optical fibers in the array are stacked in the y-direction.

When mirror 16 is rotated about the x-axis, another beam component (wavelength channel) will be normal to the mirror 16 and will be selectively reflected back through output fiber 13 and its properties measured. In this manner, the wavelength spectrum of the input beam to optical fiber 12 may be scanned and the properties of all of its beam components can be measured.

Thus the device achieves wavelength selection and provides an optical filter. The wavelength of the filter is tuned by the rotational orientation of mirror 16.

It should be noted that a similar result can be obtained if the axis of the dispersive element is rotated by 90 degrees and the mirror is tilted in the same axis that the beam is dispersed. In this configuration the light beam from the grating is dispersed into the wavelength components of the signal beam along the same axis of the fiber array, and there is some likelihood that the spectra from a fiber port will overlap with an adjacent or non-adjacent fiber port. The wavelength components which are diffracted from the dispersion element can be distinguished by increasing the separation of the fiber ports, although this will require a large optical aperture. To obtain satisfactory performance fiber port separation would be increased to three or more times larger than the separation required when the axis of the dispersive element is orthogonal to the fiber array.

It should be understood that a function of the rotating mirror 16 is to select a wavelength component of the incident beam and return it to a fixed position, in the case of the arrangement of FIG. 2, to output optical fiber 13/detector 21. An equivalent result may be achieved using a refractive beam steering element, and tilting or translating the refractive element to select a given wavelength and steer it to a fixed output/detector. A simple implementation of this is a lens or a flat or wedged transparent plate. The output/detector is this case is located on a side of the plate opposite to the input optical fiber. In this description, reference to a mirror or to a beam steering element should be construed as referring to and including equivalent structures such as those just mentioned.

It should be recognized that the optical paths in the x-axis cross section of FIG. 2 are unchanged by the tilt of mirror 16 in the y-z plane. This is due to the fact that lens 14 focuses all input beams on the axis of rotation of the mirror. The reflecting surface along the tilt axis remains essentially fixed when the mirror is tilted.

The orientation of the mirror may be changed by an actuator or several actuators. The mirror may comprise a micro electro-mechanical system (MEMS), or comprise a discrete mirror driven by motors or any other types or actuators. The tilt of the mirror may be changed in one axis, or more than one axis.

Another WDM channel may be input as an input beam to optical fiber 18. The output of the beam components from this channel are directed through output optical fiber 19 and measured by the associated photodetector as shown in the top portion of FIG. 2.

It should be appreciated by those skilled in the art that, while the array of input optical fibers, e.g., 12 and 18, and the array of output fibers 13 and 19 are shown closely packed and precisely aligned, the device input optical fibers and the device output optical fibers may have any length and be routed in any suitable fashion to other components/couplers in the system. For example, the photodetectors 21 are shown as an array of elements receiving light beams directly from the closely packed array of output optical fibers. However, the optical fiber 13 may route an optical signal to a photodiode non-aligned with respect to the output array of optical fibers.

The detection device may take any of a variety of forms, and measure a variety of optical beam properties. The arrangement shown is simple and useful for illustration. If the input beams are suitably time division multiplexed, a single detection device may be used. Alternatively a single spectrum analyzer may be used as the detection device.

In this description the optical elements are shown as separate elements. These represent functional elements. The physical elements providing these functions may, in some cases, be combined as a single module. For example, a grating may have a reflective surface or an attached or integral lens.

Figure 3A:
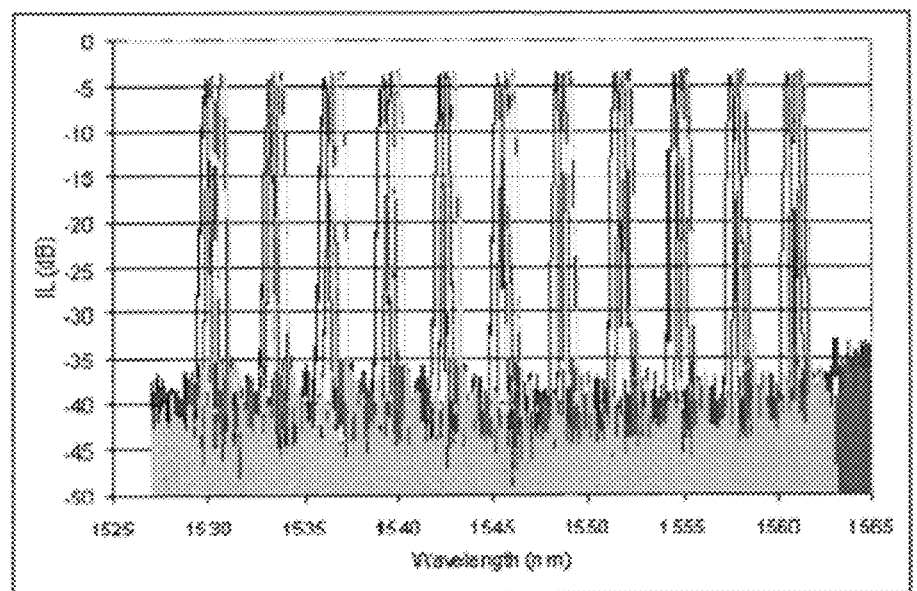
FIGS. 3A and 3B show performance data for the embodiment of FIG. 1.
Figure 3B:
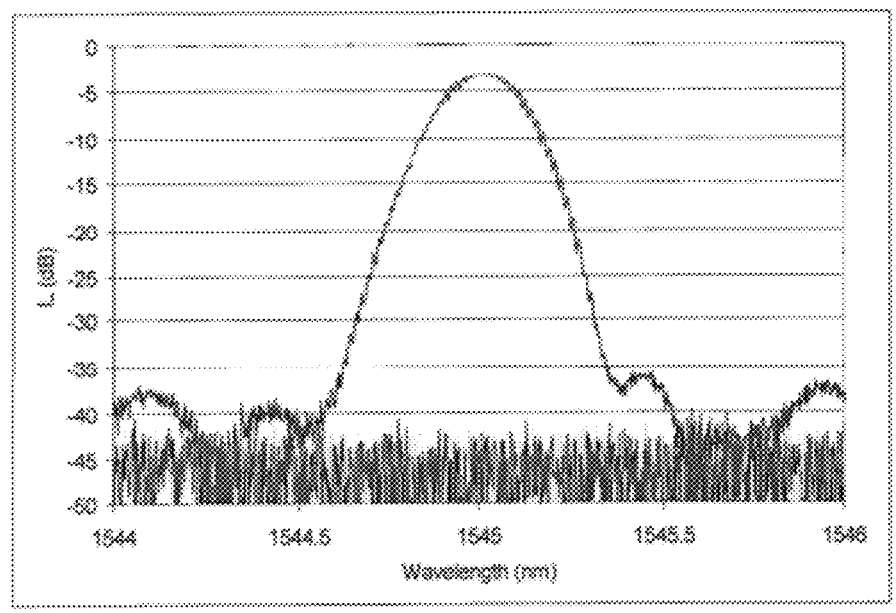

FIGS. 3A and 3B provide test results of a device built with the fiber array and optical figuration of FIGS. 1 and 2. The filter is characterized by optical spectrum analyzer (OSA). The light from a broadband light source is coupled to the input fiber. The output fiber is connected to the OSA, and the spectrum is taken. The spectrum shows that the filter produces high transmission in a narrow band. The location of the passband (filter wavelength) may be changed electronically as described by actuating the MEMS mirror control.

In the embodiments of FIGS. 1 and 2, the device is shown with a 1×8 fiber array, and can achieve 4 ports (4 tunable filters), in which all the ports are tuned simultaneously. In this array, all of the optical fibers are aligned in a single plane. The number of fibers may vary but typically will be an even number to produce pairs of fibers, each pair with an input fiber and an output fiber.

Figure 4A:
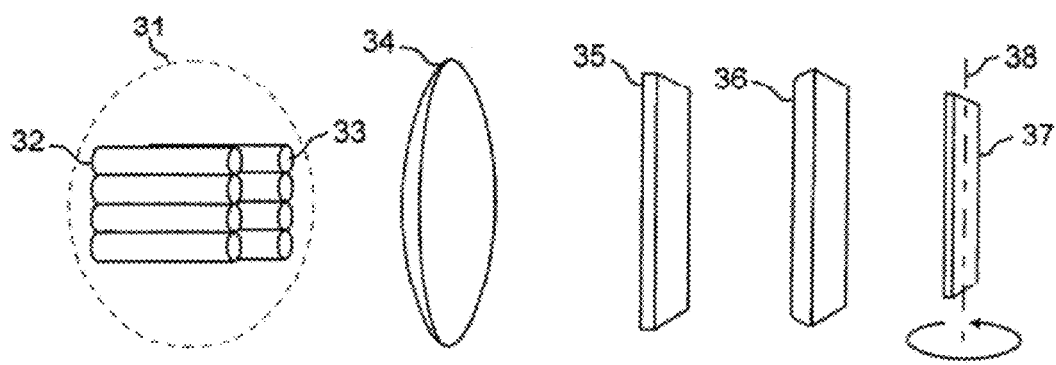
FIG. 4A is a perspective view showing a second embodiment of a tunable multiport optical filter.

The fiber array may have other formats, one of which is illustrated in FIGS. A and 4B. FIG. 4A is a perspective view showing a second embodiment of a tunable multiport optical filter. FIG. 4B is a schematic illustration of the operation of the tunable multiport optical filter of FIG. 4A, showing ray diagrams for the x- and y-directions of the device. In FIGS. 4A and 4B, a fiber array 31 is arranged in a 2×4 format to achieve a 4-port tunable filter. FIGS. 4A and 4B also show a different optical configuration. In the system of FIGS. 4A and 4B, two lenses are used. The first lens, 34, is a spherical or aspherical lens used to collimate the beam in both x- and y-directions. The second lens, 36, is a cylindrical lens. It focuses the input beam from input optical fiber 32 in the y-direction but does not focus the beam in x-direction. In this optical configuration, the returning light beam returns to the associated output optical fiber 33 with the same y-direction coordinates. The tunable multiport optical filter in FIGS. 4A and 4B further includes a dispersion element 35. For simplicity in the illustration the photodetectors have been omitted.

In the systems described it is not required that the ports be tuned simultaneously.

Figure 5:
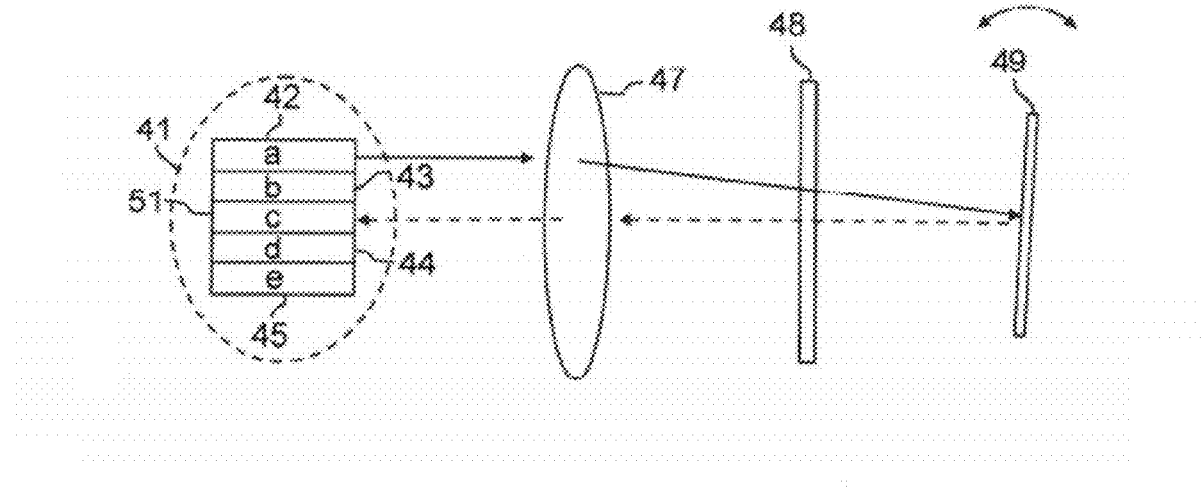
FIG. 5 is a schematic illustration similar to that of FIG. 2, showing ray diagrams for the x- and y-directions in the device of the second embodiment.
Figure 5:
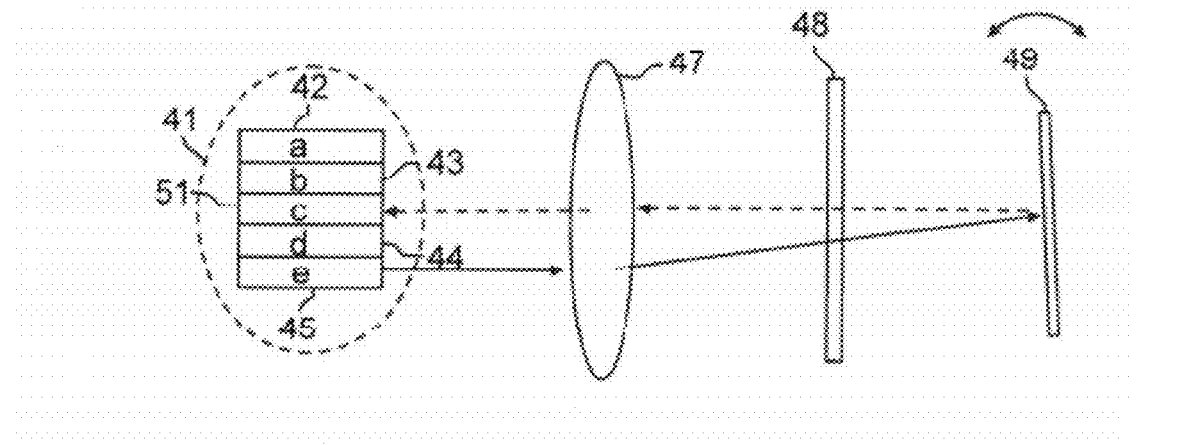

If the mirror orientation can be controlled by rotating it about 2 different axes, i.e., both the x-axis and the y-axis, then the ports can be read in series, i.e., there will be one input fiber and a number of output fibers. In FIG. 5, the optics are configured similarly as in FIGS. 1 and 2. However, the fiber array 41 is a 1×4 format array. When the mirror is rotated to a first angle about the y-axis, light from the upper input fiber 42 is coupled back to output fiber 51. When the mirror is rotated to a second angle, shown in the lower portion of FIG. 5, light from the lower input fiber 44 is coupled back to output fiber 51. By employing this method, multiple outputs from different input fibers 42-45 can be read in series. Note that the mirror still rotates about the x-axis to select the different wavelengths.

It should be evident that the number of optical fibers in a multiport optical filter according to the invention may vary widely. In embodiments like FIGS. 2 and 4 there will typically be at least three input optical fibers and three output optical fibers, producing a three port device array. In the embodiment like FIG. 5 there will preferably be at least two input optical fibers and one output optical fiber, producing a three port device.

The light waveguides described above are optical fibers. However, other waveguide arrays may be substituted. For example, the arrays of optical waveguides may comprise optical integrated circuits (OIGs) where parallel waveguides are formed in a common substrate such as lithium niobate, doped glass, or indium phosphide. The term "waveguide" used herein is intended to include any suitable light guiding element.

The placement of the optical fibers, both for the input side and the output side may vary significantly. In the embodiments of FIGS. 2 and 4, the optical fibers in the arrays are arranged in a single parallel plane. However, any x-y array configuration may be used.

As mentioned earlier, the devices described above may be used as wavelength selective devices in any application requiring that function. The embodiment shown in FIG. 5 for example shows four input ports and one output port. Many optical channels may be introduced into the input ports 42-45 while only a single wavelength exits at the output port 51 from any input port at one time. For this application the tilt of the reflector element 49 is controlled about two axes to pass only the channel selected for a specific input port. It then remains fixed until a different channel and port selection is made.

The device of FIG. 5 is shown as an n×1 device, where n denotes input(s) and 1 denotes output. However, it may also be easily modified to produce a 1×n device. Therefore the recited inputs and the output may be interchanged, or multiple inputs and output can be configured to monitor or route channels as determined by the input and output fiber orientations and the rotation of the reflector element 49 in both axes.

A wide variety of applications exist for wavelength selective devices. For example, channel selectors in DWDM transmission and display require a single channel to be selected among a large number of channel options. Recognizing that the reflector element can itself provide added functionality, optical systems may be employed in which the reflector is tilted to transmit a predetermined sequence of wavelengths. These may be used in coding devices.

In the embodiments described above, the reflector is tilted with respect to the dispersive element to achieve wavelength selectivity. However, devices may be designed in which the dispersive element is moved and the reflector is fixed. Likewise other optical elements, for example, lenses, may be used to achieve the same effect. All arrangements in which some controlled predetermined movement of a dispersive element with respect to a reflector or refractive element to achieve the purpose of the invention should be considered equivalent.

As mentioned earlier, the beam steering element is preferably a light reflecting element or a light refracting element. In both cases the element is typically operated as a moving element, e.g., a MEMS mirror or the like. Optionally, the beam steering function may be provided by a non-moving element, for example, an electro-optic device. In one embodiment using an electro-optic device the beam steering element relies on changes in refractive index of an electro-optic medium. The changes in refractive index may be used to change the direction of diffraction of a light beam being analyzed or switched.

Figure 6:
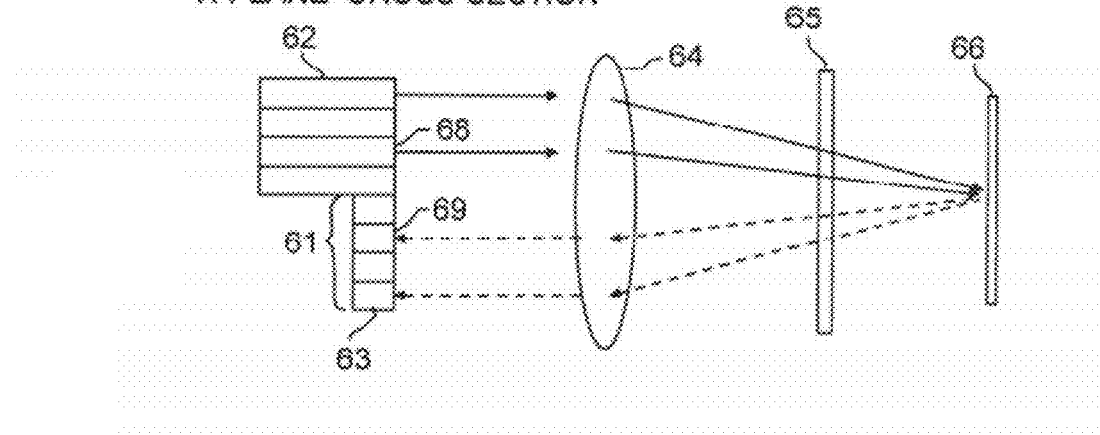
FIG. 6 is a schematic illustration similar to that of FIG. 5 showing an alternative arrangement.
Figure 6:
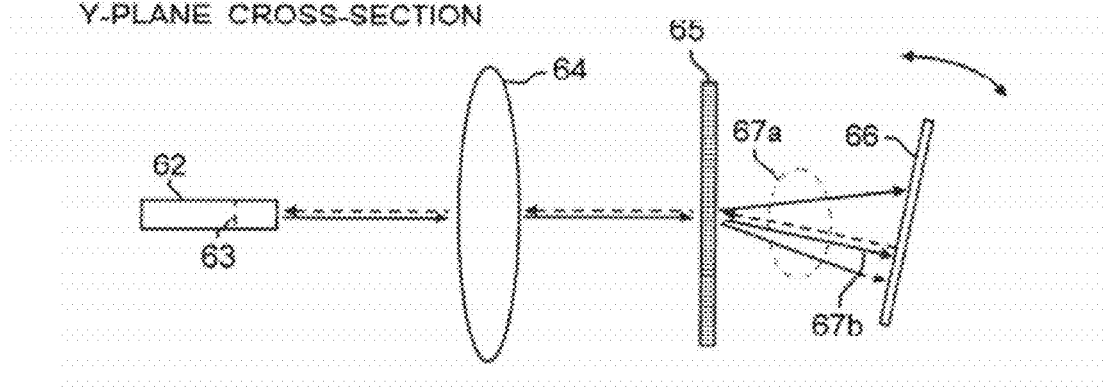

FIGS. 1, 2, 4A, 4B, and 5 illustrate embodiments of the invention using an input array of optical fibers, and wavelength selective beam steering means for moving light beam components to one or more selected output optical fibers in an output array. That arrangement is suitable for many of the applications anticipated for the invention, and particularly those wherein the wavelength selective mechanism of the invention is used to implement optical switching functions. In the case of an OCM device, an output optical signal may not be needed. In such case, the output optical fiber array is not required. This modification is illustrated in FIG. 6, which is a modification of FIG. 2, and reference numbers 62 to 69 are associated with elements similar to 12-19 in FIG. 2. However, the output array of optical fibers is omitted in this embodiment and the selected wavelengths are incident directly on photodetectors 63 and 69 of photodetector array 61. As in the earlier embodiment, the photodetector array may be an optical spectrum analyzer.

With reference to FIG. 5, the operation described is a 4×1 device wherein optical fibers a, b, d, and e are input optical fibers, each associated with a single output optical fiber 51. In optical switching parlance this could be described as an X by 1 device, with X inputs and 1 output. The switching operation in these devices is operated sequentially since the wavelength selection is time divided. It is important to recognize that the sequence may be other than a, b, d, and e. It may be a, c, d, b, or any other suitable sequence. It is also important to recognize that the amount of time in any one switching configuration can be arbitrary, allowing one or more ports to be prioritized over any other. Both the switching sequence and switching time can be arbitrarily sequenced and prioritized based on the application.

Alternatively, the device shown in FIG. 5 may be operated with multiple input optical fibers and multiple output optical fibers. For example, optical fibers a, and b, may be output optical fibers, and c, d, and e, input optical fibers. This would be equivalent to two 3×1 optical switches. Preferably, the input beams for input optical fibers a and b are time divided to maintain separation between the two optical switches.

Figure 7:
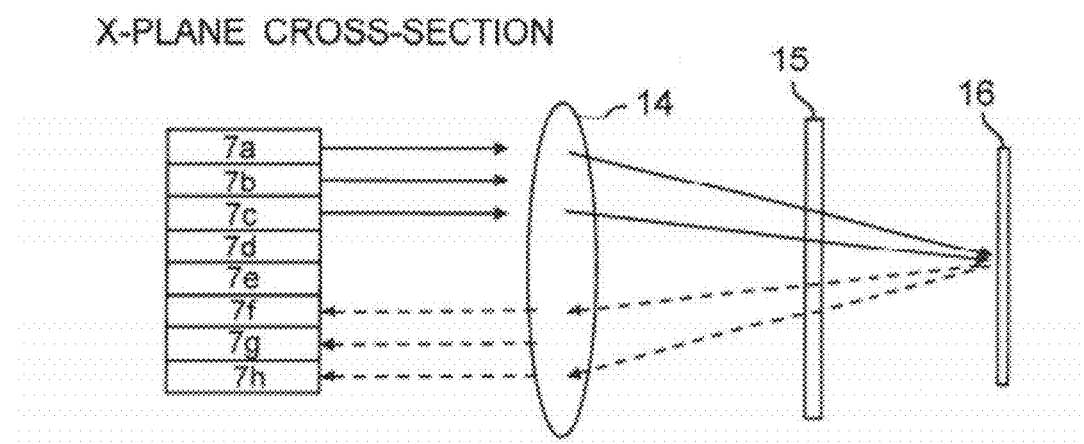
FIG. 7 illustrates an alternative approach to operating the devices described.

In another alternative embodiment the parallel readout implementation of the embodiment of FIG. 2 may be used in combination with a serial readout as in the embodiment of FIG. 5. This modification is illustrated in FIG. 7, where the optical fiber input array comprises eight optical fibers 7a, 7b, 7c, 7d, 7e, 7f, 7g, and 7h, and a corresponding optical fiber output array. Optical fibers 7a and 7b operate in the parallel mode of FIG. 2, wherein output optical fibers 7f and 7g are dedicated outputs for input fibers 7a and 7b. Optical fibers 7c, 7d, 7e, and 7f operate in the serial mode of FIG. 5, as a 3×1 optical switch. Optical fiber 7c is shown as the output port, and optical fibers 7d, 7e, and 7f, the input ports.

These embodiments illustrate the very large versatility of devices operating according to the invention that operate with a wavelength selective mirror (for example) that may be tilted around more than one axis. In the arrangement shown, the rotation about the y-axis selects the beam position, i.e., the output port, while the rotation about the x-axis selects the wavelength. The biaxial rotation allows a selected wavelength component of an input beam to be directed as an output beam to any point in the x-y plane. This gives rise to another level of versatility in the design of devices operating according to the principles of the invention. This will be described in conjunction with the illustrations in FIGS. 8, 9, 10A and 10B.

Figure 8:
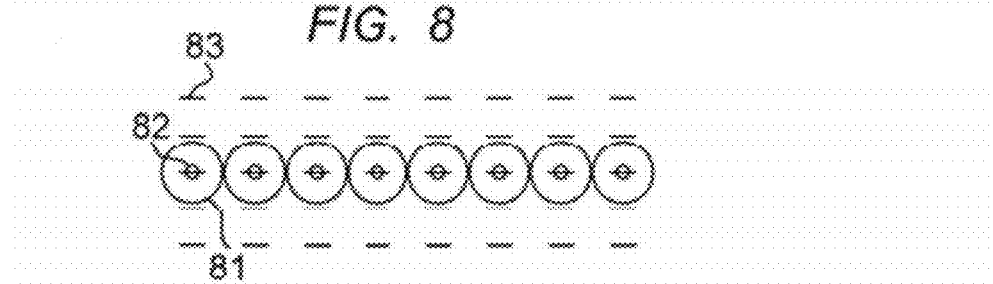
FIGS. 8, 9, 10A and 10B are views showing different output array formats useful in connection with various embodiments of the invention.

FIG. 8 shows eight output optical fibers in a linear array. The overall device includes one or more input optical fibers not shown. The device may perform any desired switching function X by Y where X may be one or more and Y may be one or more. For example, it may perform 1 by Y switching, X by 1 switching, or 2 by Y and X by 2 switching. The latter may be considered as combinations of the former.

The view in FIG. 8 is of the x-y plane in the manner of the previous figures. Each output optical fiber is shown with an optical fiber core 82, and an optical fiber cladding 81. The wavelength spectra are shown as seven bars 83 representing the output wavelengths. As described earlier, the spectra are generated by the wavelength selective elements. In FIG. 8 all eight spectra are shown but typically in a one by n switch only one spectrum will be seen at a time. As described earlier, the rotation of the reflector (or other form of beam steering element) about the y-axis selects one of the eight output optical fibers shown. Rotation about the x-axis produces the wavelength spectrum. The wavelength spectrum in FIG. 8 is shown by five bars, with the center wavelength incident on the core of one of the output optical fibers.

While five wavelengths are illustrated in FIG. 8, there may be any number, typically more than 3. For an OCM device in a typical WDM system there may be 40, 80, 96, or more than 100 channels.

Figure 9:
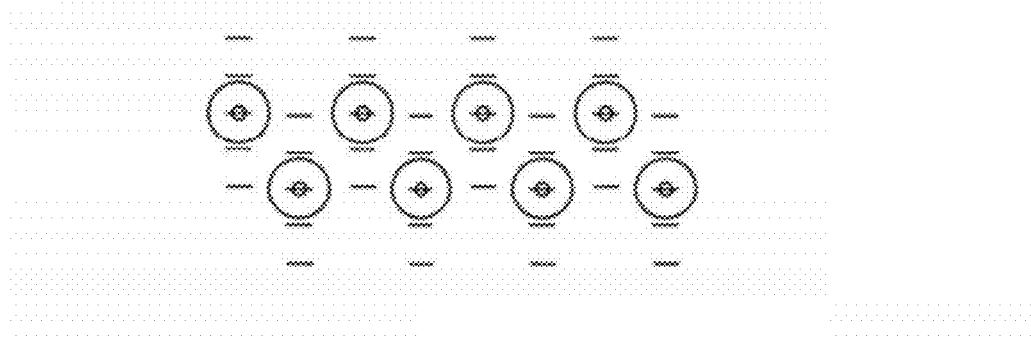

The output array in FIG. 8 is linear, with all output optical fibers located along an x-axis as shown. It is evident that the mirror that directs a chosen wavelength component to an output optical fiber/detector rotates about the x-axis through an angle sufficient to make all of the beam components incident on the output optical fiber. However, the mirror may rotate further so that the output spectrum of the wavelength selection elements may be displaced further. This allows output optical fibers to be located virtually anywhere in the x-y plane. This principle of operation is illustrated in FIG. 9, where four output optical fibers (the same elements as shown in FIG. 8) are located along a first x-axis, and four are located along a second x-axis, displaced from the first in the y-direction. The operation of the device may utilize suitable software for controlling the rotation of one or more of the beam selecting elements (typically the mirror) to route a selected beam component to selected output optical fiber/detector.

Figure 10A:
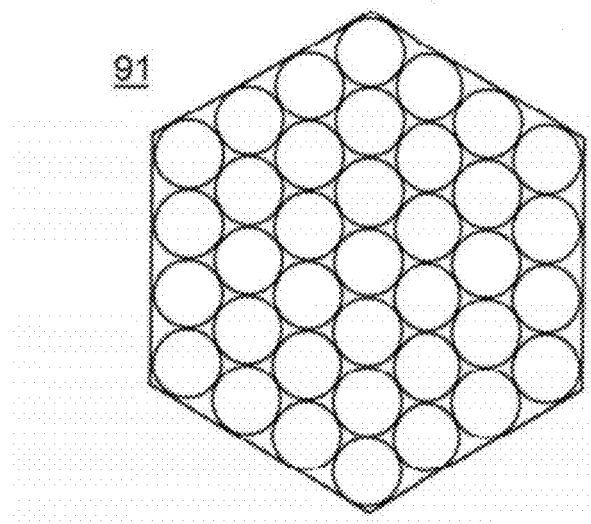
Figure 10B:
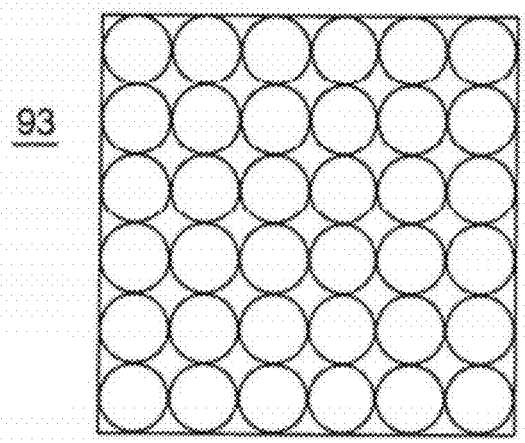

In FIG. 9, the optical fibers are shown spaced apart for clarity. In many cases it may be preferred to bundle the optical fibers in a close packed array. This allows the size of the aperture of the device to be optimized. Two such packed arrays are shown in FIGS. 10A and 10B. The array 91 in FIG. 10A has 37 optical fibers arranged in a hexagonal close-packed array for optimum packing density. To address each member of this array requires the rotation of the mirror to be changed in both axes for each address, and overall involves eight positions in the x-direction and eight positions in the y-direction. The array 93 of FIG. 10B has 36 optical fibers arranged in rows as shown. While this is a more loosely packed array, the address mechanism is slightly simpler, requiring only one change in x-direction position for each six changes in y-direction. It should be evident that with biaxial capability in the beam steering mechanism any x-y position may be addressed. This includes members in an array that is randomly organized.

It should be noted that the precision of the fiber array spacing in either x or y axes does not affect the performance provided the rotation of the mirror in the x or y axes can be optimized to minimize loss. This can be facilitated through a calibration process which stores a look up table with the location of the fibers stored, or using an optimization algorithm such as a hill-climbing algorithm that seeks to minimize the loss in any optical light path.

To identify or monitor the positions of the output optical fibers in an organized or random array it may be useful to employ a monitor that periodically locates the position of the members of the array. One suitable device for doing this is a CCD or CMOS imaging device which, when the output optical fibers are illuminated, can record the spatial position of each member in the array. A CCD imaging device is also useful as a light output detector in the normal operation of any of the devices or systems described earlier. If the CCD image plane is made as large as the aperture of the device it can serve as an output detector without regard to the precise locations of the individual members in the array.

As will be understood by those skilled in the art, arrays similar to those shown in FIGS. 8-10 may be used on the input optical fiber side as well as the output. The biaxial beam steering just described allows any one, or combination, of a large array of inputs to address any one, or combination, of a large array of outputs. Obviously smaller arrays, with any given number of input optical fibers and any given number of output optical fibers/detectors may be used. Accordingly, a very large number of OCM devices, or optical switches, may be designed using the principles of the invention.

Figure 11A:
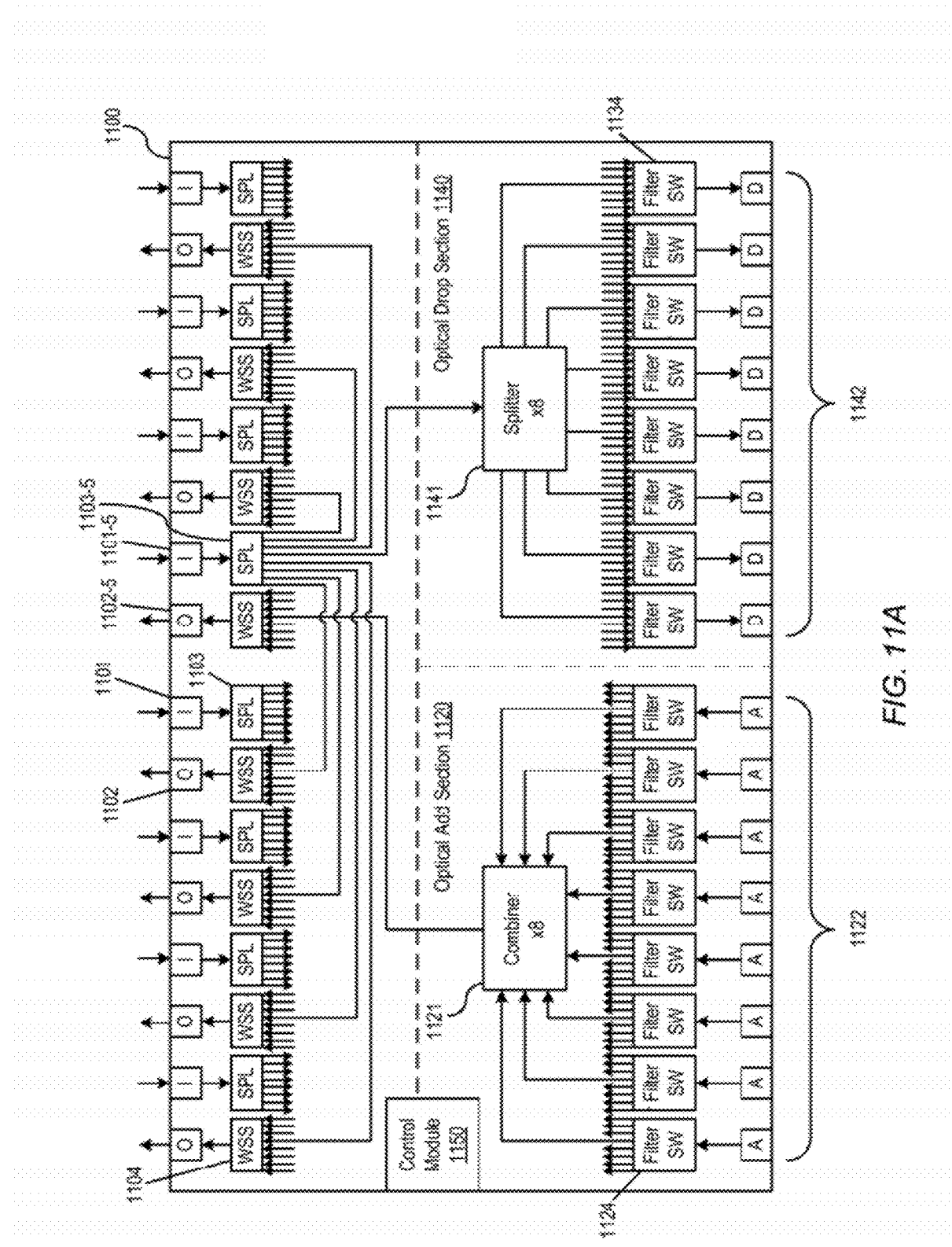
FIGS. 11A and 11B are block diagrams of a reconfigurable optical add-drop multiplexer according to an embodiment of the present invention.
Figure 11B:
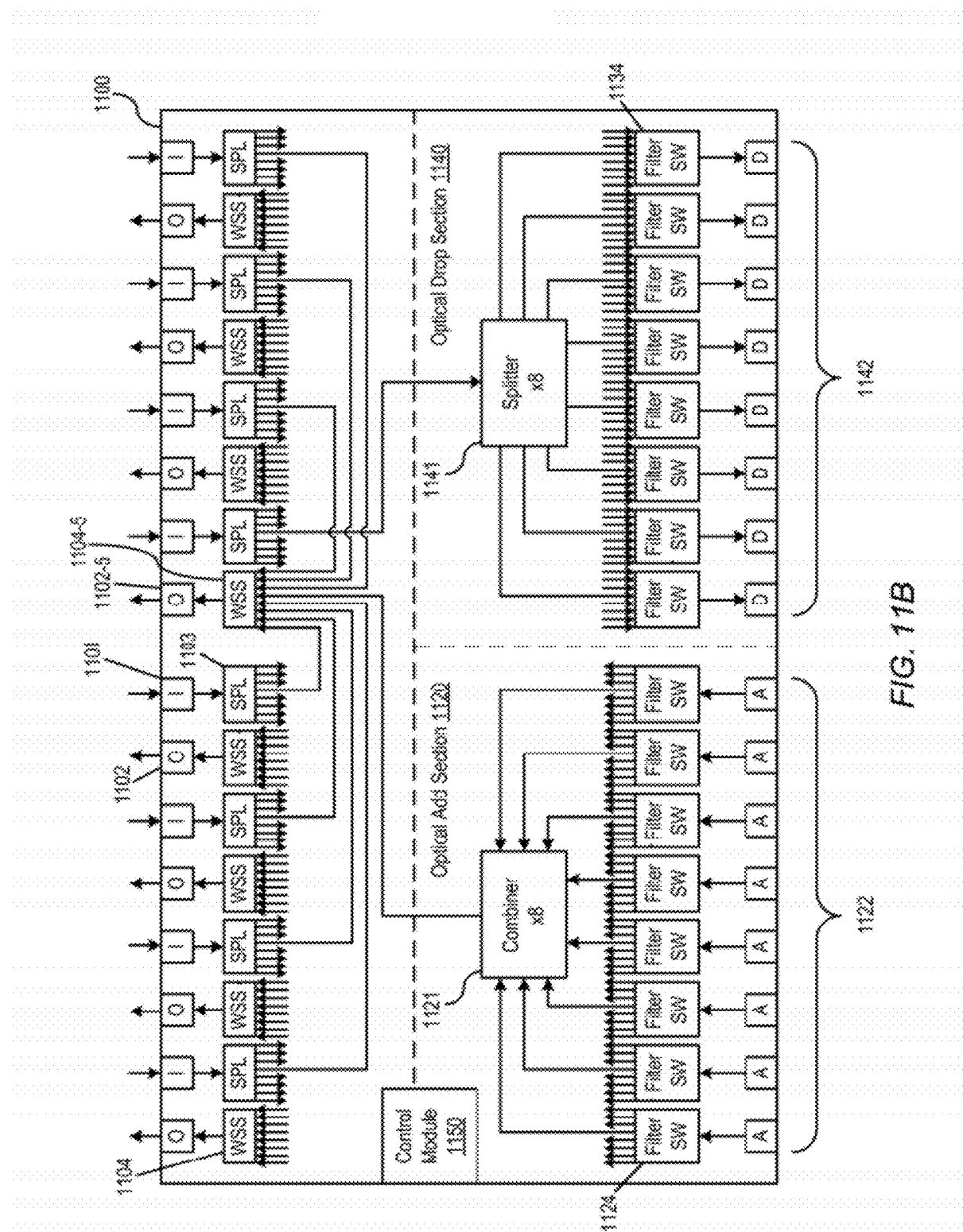

FIGS. 11A and 11B are block diagrams of a reconfigurable optical add-drop multiplexer (ROADM) 1100 according to an embodiment of the present invention. FIG. 11A illustrates the routing of a plurality of wavelength channels received at an input port 1101-5 and distributed by a splitter 1103-5. FIG. 11B illustrates the routing of a plurality of wavelength channels routed through ROADM 1100, multiplexed by a WSS 1104-5, and output through an output port 1102-5. In both FIGS. 11A and 11B, only one combiner 1121 and only one splitter 1141 are illustrated for clarity. In the illustrated embodiment, there are eight combiners and eight splitters. For the same reason, not all optical paths are illustrated.

ROADM 1100 includes K inputs ports (I) 1101, K output ports (O) 1102, splitters (SPL) 1103 (also referred to herein as "primary splitters"), L×1 wavelength selective switches (WSS) 1104, an optical add section 1120, an optical drop section 1140, and a control module 1150. Optical add section 1120 includes M add ports 1122, M filter switches 1124, and N combiners 1121 (only one of which is shown). Optical drop section 1140 includes M drop ports 1142, M filter switches 1134, and N splitters 1141 (only one of which is shown and also referred to herein as "secondary splitters"). In the embodiment illustrated in FIGS. 11A and 11B, K=L=M=N=8. In alternative embodiments, K, L, M and N typically will have values between 2 to 24.. In addition, in one or more embodiments of the present invention, filter switches 1124, 1134 have the structure of tunable multiport optical filters of FIG. 1 or FIGS. 4A and 4B, described above. Splitters 1103 and splitters 1141 are optical branching devices that an input light beam into multiple output beams.

Figure 12:
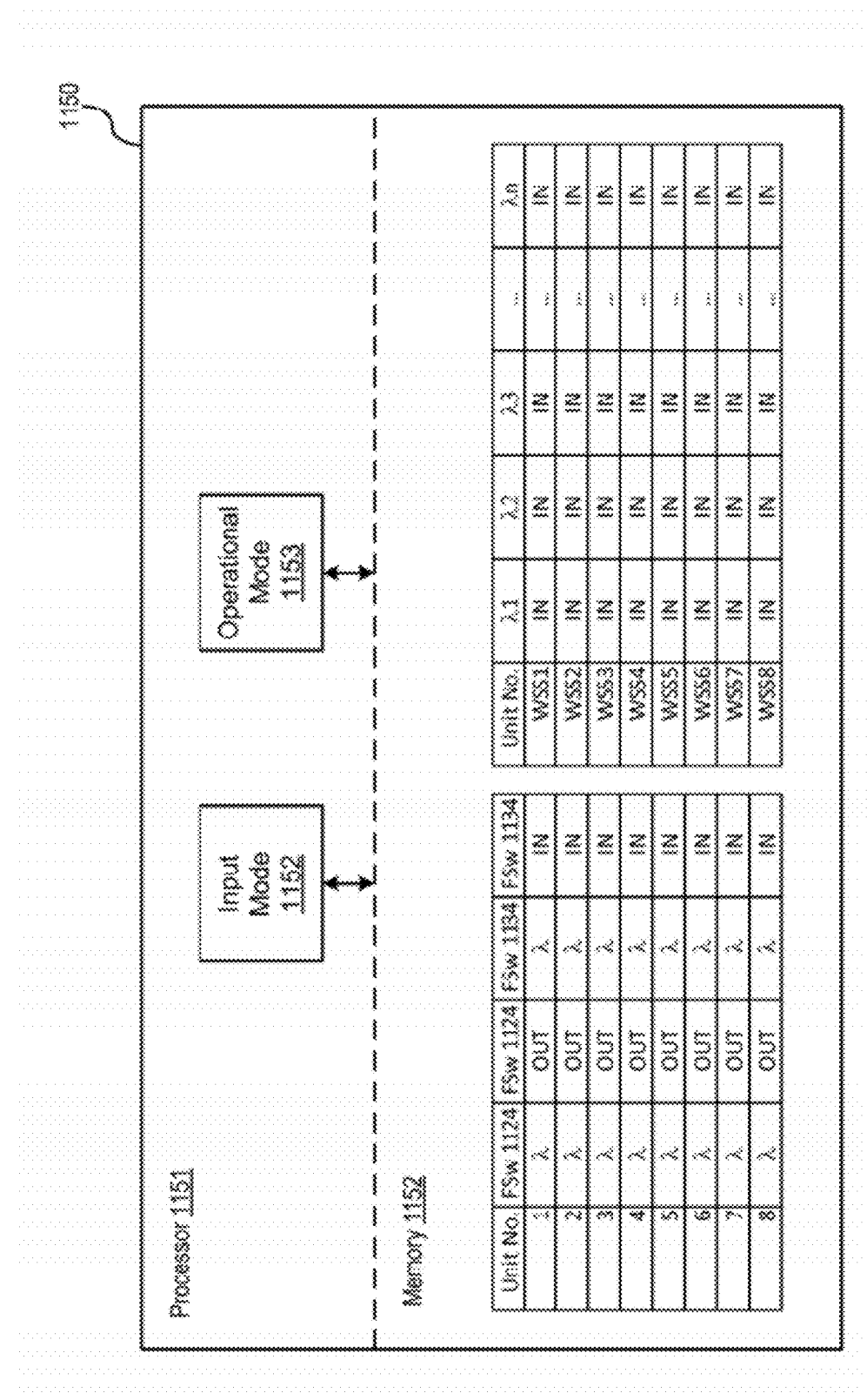
FIG. 12 is a schematic representation of a control module implemented in the reconfigurable optical add-drop multiplexer of FIGS. 11A and 11B.

Control module 1150 is further illustrated in FIG. 12, and includes a processor 1151 and memory 1152. Memory 1152 stores configuration parameters for ROADM 1100 and processor 1151 is programmed to be in the input mode 1152, during which ROADM 1100 may be reconfigured by changing the stored configuration parameters, or in the operational mode 1153, during which ROADM 1100 performs optical switching in accordance with the stored configuration parameters.

During operation, ROADM 1100 receives optical signals, which may contain one or more wavelength channels, through its input ports 1101, and directs optical signals through its output ports 1102 and drop ports 1142. The composition of optical signals transmitted through output ports 1102 and drop ports 1142 is determined according to the configuration parameters for ROADM 1100. ROADM 1100 provides a high degree of flexibility such that any wavelength channel from any optical signal introduced through add ports 1122 may be added to any of the optical signals transmitted through output ports 1102, and any wavelength channel from any optical signal received through inputs ports 1101 may be dropped through any of drop ports 1142. Indeed, the add/drop functionality provided by ROADM 1100 can be characterized as:

Colorless—any wavelength can be assigned to any add/drop port;
Directionless—add/drop wavelengths can be assigned to any port in any direction; and
Contentionless—paths with same wavelength components exiting or entering the ROADM 1100 from different directions can simultaneously be assigned to different add/drop ports.

The configurable parameters of ROADM 1100 include two control settings for each of filter switches 1124, indicated as λ and OUT in FIG. 12, control settings for each of filter switches 1134, indicated as λ and IN in FIG. 12, and control settings per wavelength channel for each of wavelength selective switches 1104, indicated as IN in FIG. 12. The λ control setting for filter switch 1124 determines the wavelength channel of an optical signal input through a corresponding add port that is to be added. The λ control setting for filter switch 1134 determines the wavelength channel of an optical signal that is to be dropped. The OUT control setting for filter switch 1124 determines the output port to which the wavelength channel to be added is directed. The IN control setting for filter switch 1134 defines the correspondence between input ports and drop ports. The control settings for wavelength selective switches 1104 determine the source of the wavelength components of the resulting composite optical signal. The IN control setting associated with a particular wavelength, e.g., λ1, defines the input port number of the optical signal from which the λ1 component will be extracted and included as a wavelength component of the composite optical signal outputted by the wavelength selective switch.

When an optical signal is received at an input port, it is first split into split optical signals by a primary splitter coupled to the input port. The split optical signals are distributed to each of output ports 1102 other than the complementary output port. That is, as shown in FIG. 11A, the split optical signals from the primary splitter coupled to input port 1101-5 are distributed to each of output ports 1102 other than output port 1102-5, which is the output port complementary to input port 1101-5. A split optical signal from the primary splitter is also transmitted to a corresponding secondary splitter 1141. Eight secondary splitters 1141 are provided in ROADM 1100, one or more for each of the primary splitters. Each secondary splitter 1141 further splits the optical signals and distributes them to each of filter switches 1134. Filter switches 1134 perform N×1 switching of the optical signals and wavelength channel selection in accordance with their control settings, such that each of filter switches 1134 directs a selected wavelength channel from one of the optical signals at its input ports to a corresponding drop port.

Wavelength channels are added by introducing them through add ports 1122. Filter switches 1124 each have control settings that define the wavelength channel appearing at a corresponding add port and the output port at which the wavelength channel to be added is to appear. For example, if a wavelength channel to be added is to appear at the fifth output port, e.g., output port 1102-5, the filter switch 1124 that receives this wavelength channel should be configured to receive this particular wavelength channel and direct it to combiner 1121. Combiner 1121 then outputs the wavelength channel of interest to the wavelength selective switch corresponding to output port 1102-5. This optical path is illustrated in FIG. 11B.

As further illustrated in FIG. 11B, each of wavelength selective switches 1104 receive multiple inputs, including one from a corresponding combiner 1121 and seven from primary splitters associated with input ports that are not complementary to the output port to which the wavelength selective switch is coupled. Each of wavelength selective switches 1104 has control settings that define the source of the wavelength components that make up the resulting composite optical signal that is output through the corresponding output port. For example, if one or more wavelength channels that are to be added appear at its fifth input port, the input port control setting for such wavelength channels should be defined at the fifth input port.

Figure 13A:
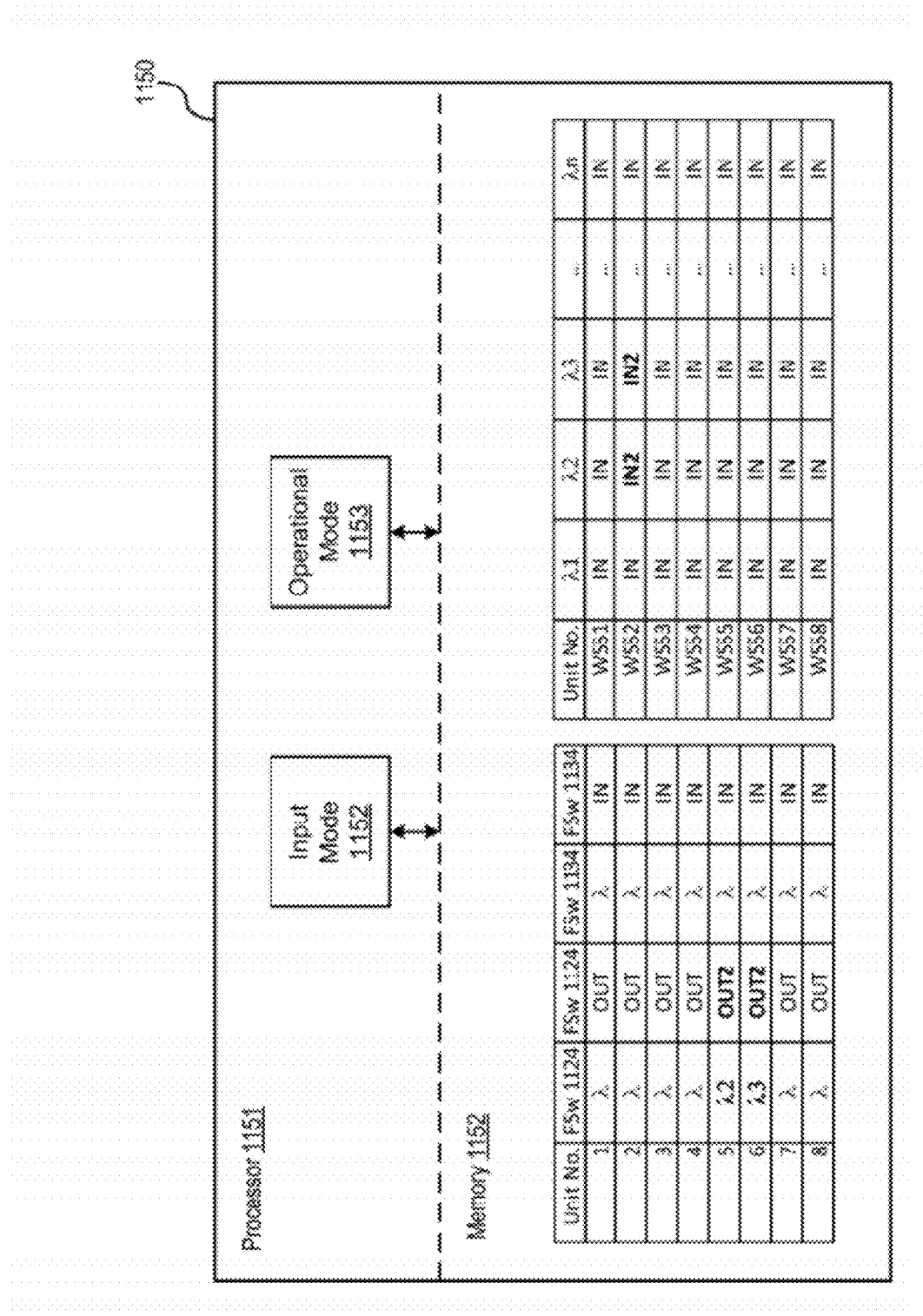
FIG. 13A shows changes in configuration parameters of the reconfigurable optical add-drop multiplexer of FIGS. 11A and 11B when adding wavelength channels from different add ports to the same output port.
Figure 13B:
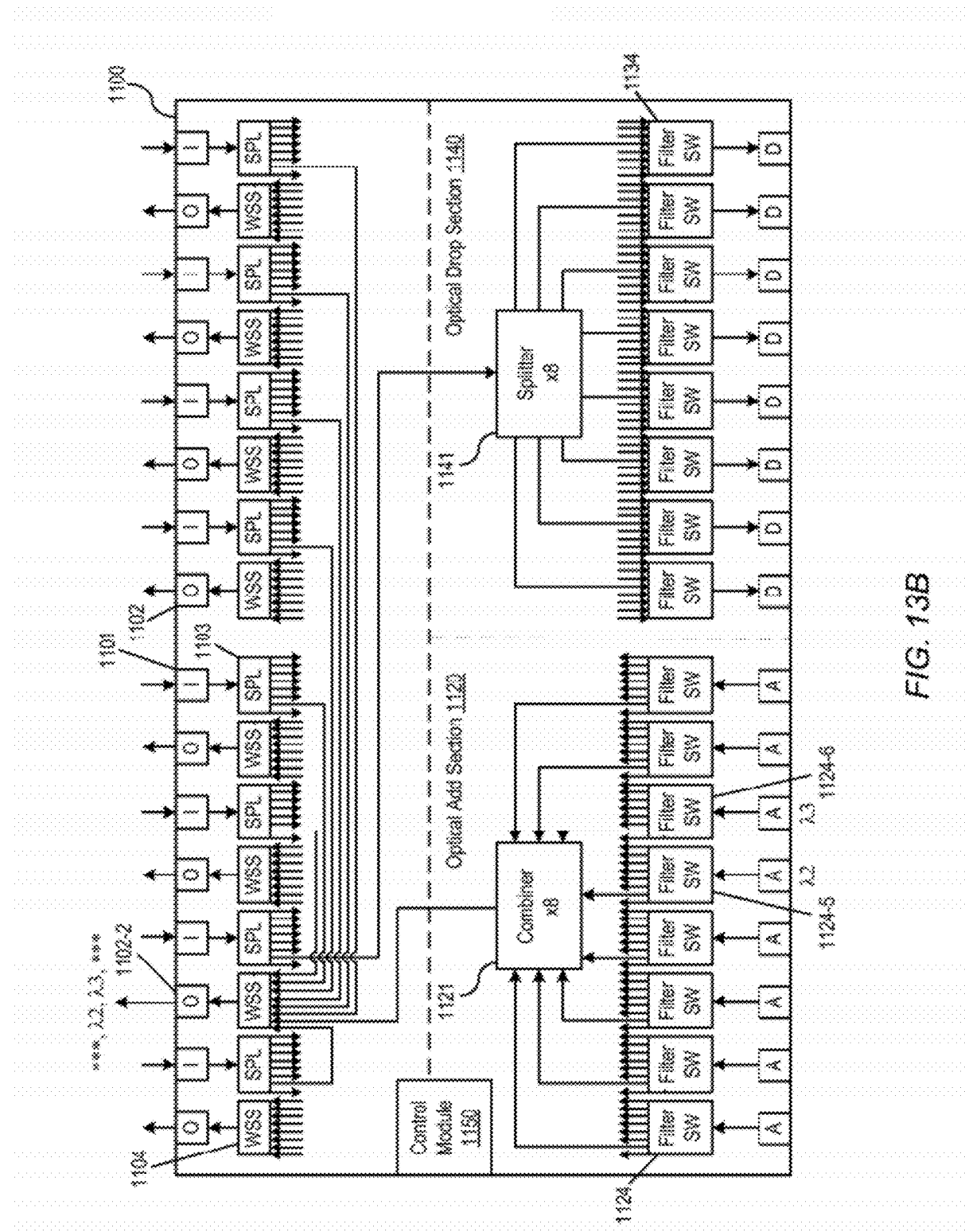
FIG. 13B is a block diagram of the reconfigurable optical add-drop multiplexer according to an embodiment of the present invention that illustrates optical paths of added wavelength channels when the reconfigurable optical add-drop multiplexer has the configuration parameters shown in FIG. 13A.

FIG. 13A shows changes in configuration parameters of ROADM 1100 when adding wavelength channels from different add ports to the same output port. FIG. 13B is a block diagram of ROADM 1100 that illustrates optical paths of wavelength channels added to the output signal from one of output ports 1102, i.e., output port 1102-2. In this example, the wavelength channels that are added are $\lambda2$ that is coupled to filter switch 1124-5 and $\lambda3$ that is coupled to filter switch 1124-6. These wavelength channels are added to the output signal appearing at output port 1102-2.

Initially, filter switch 1124-5 is configured to receive the $\lambda2$ wavelength channel from a corresponding add port in accordance with the control setting for that tunable filter defined in control module 1150. As shown in FIG. 13A, the control setting for filter switch 1124-5 is defined as $\lambda2$. This control setting causes the filter switch 1124-5 to receive only the $\lambda2$ wavelength channel from the corresponding add port.

In a similar manner, filter switch 1124-6 is configured to receive the $\lambda3$ wavelength channel from a corresponding add port in accordance with the control setting for that tunable filter defined in control module 1150. As shown in FIG. 13A, the control setting for filter switch 1124-6 is defined as $\lambda3$. This control setting causes the tunable filter 1123-6 to receive only the $\lambda3$ wavelength channel from the corresponding add port.

The second control setting for the filter switches determines the output port to which the received wavelength channel is to be directed. As shown in FIG. 13A, the second control setting for filter switch 1124-5 and the second control setting for filter switch 1124-6 are both set as OUT2. This control setting causes each of filter switches 1124-5 and 1124-6 to direct their received wavelength channels to the second output of the power switch. As shown in FIG. 13B, the second outputs of filter switches 1124-5 and 1124-6 are coupled via a combiner 1121 to the second wavelength selective switch, i.e., the one that generates a composite output signal that appears at output port 1102-2. The control settings for this wavelength selective switch are shown in FIG. 13A in the WSS2 row, and specify IN2 for both $\lambda2$ and $\lambda3$. This means that the composite output signal generated by the second wavelength selective switch will include $\lambda2$ and $\lambda3$ wavelength channels that are supplied through the second input port of the wavelength selective switch, namely the input port of the wavelength selective switch coupled to second outputs of filter switches 1124-5 and 1124-6 that supplied the $\lambda2$ and $\lambda3$ wavelength channels. Consequently, the optical signal transmitted through output port 1102-2 includes the added $\lambda2$ and $\lambda3$ wavelength channels.

Figure 14A:
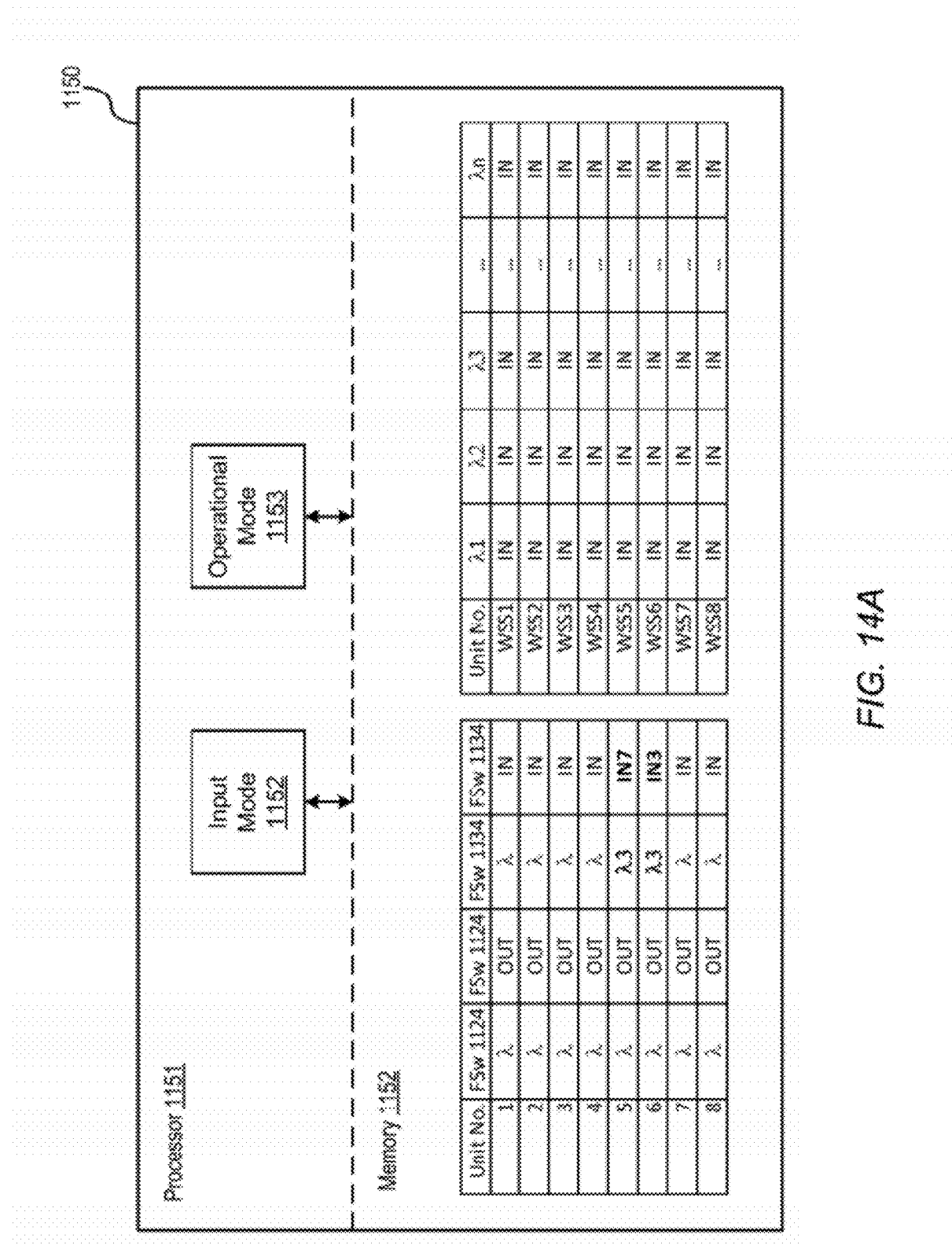
FIG. 14A shows changes in configuration parameters of the reconfigurable optical add-drop multiplexer of FIGS. 11A and 11B when dropping the same wavelength channel simultaneously at different drop ports.
Figure 14B:
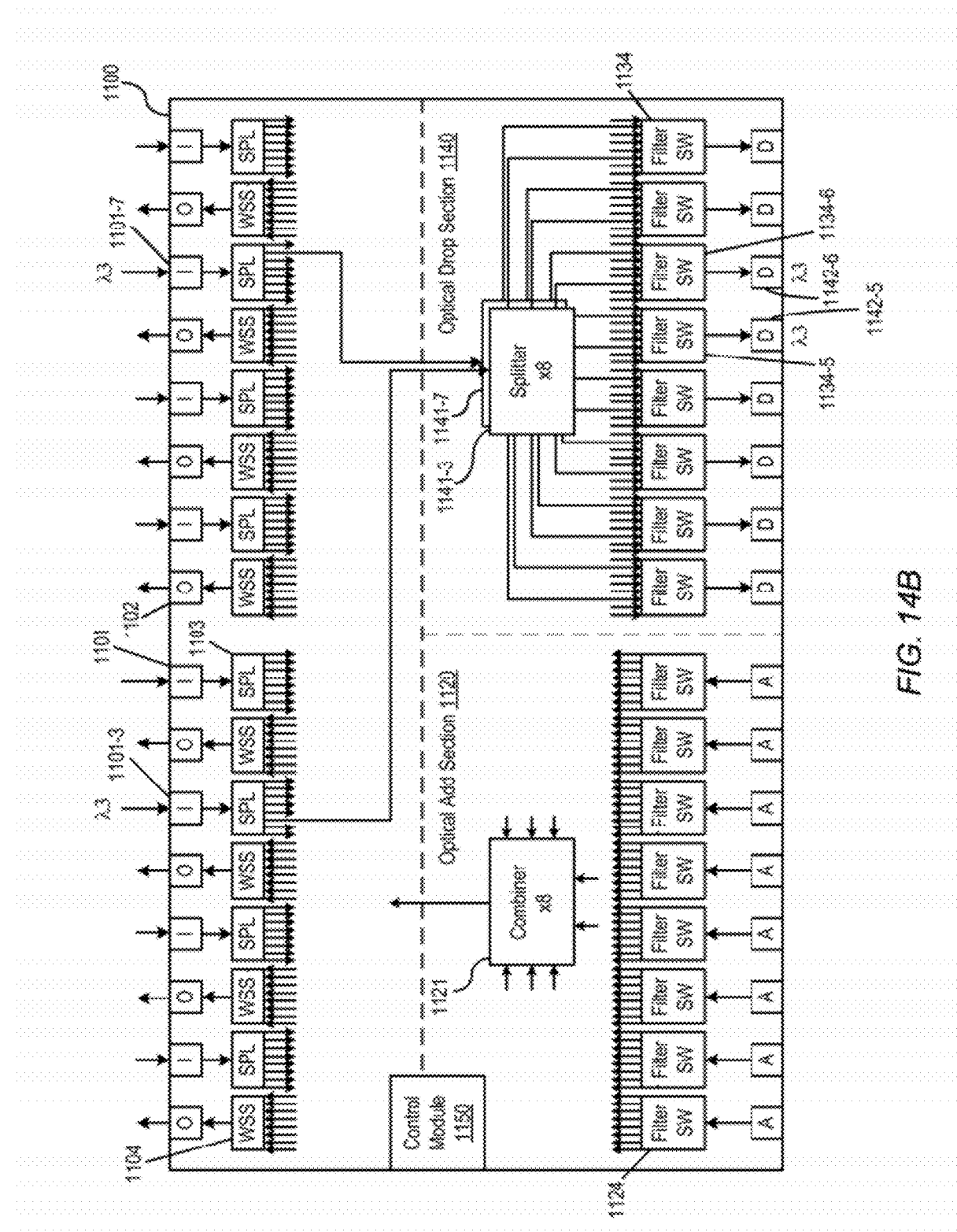
FIG. 14B is a block diagram of the reconfigurable optical add-drop multiplexer according to an embodiment of the present invention that illustrates optical paths of dropped wavelength channels when the reconfigurable optical add-drop multiplexer has the configuration parameters shown in FIG. 14A.

FIG. 14A shows changes in configuration parameters of ROADM 1100 when dropping the same wavelength channel simultaneously at different drop ports. FIG. 14B is a block diagram of ROADM 1100 that illustrates optical paths of the added wavelength channels through ROADM 1100. In this example, the $\lambda3$ wavelength channel contained in an optical signal received at input port 1101-3 is to be dropped via filter switch 1134-5 and, at the same time, the $\lambda3$ wavelength channel contained in an optical signal received at input port 1101-7 is to be dropped via filter 1134-6.

Initially, the splitter coupled to the input port 1101-3 generates split optical signals, one of which is transmitted to splitter 1141-3 for further splitting, and the splitter coupled to the input port 1101-7 generates split optical signals, one of which is transmitted to splitter 1141-7 for further splitting. Each of filter switches 1134 subsequently receives the further split signals that contain the two $\lambda3$ wavelength channels to be dropped at its third and seventh input ports, respectively. Control settings for these filter switches define the drop port through which the two $\lambda3$ wavelength channels are to be dropped.

As shown in FIG. 14A, one of the control settings for the fifth filter switch, which corresponds to filter switch 1134-5, is defined as IN7, indicating that the seventh input port is to be coupled to the output of this filter switch. The other control setting for filter switch 1134-5, according to FIG. 14A, is $\lambda3$, so the $\lambda3$ wavelength channel of the optical signal appearing at the seventh input port is permitted to pass through this filter switch and subsequently dropped at drop port 1142-5.

Similarly, as shown in FIG. 14A, one of the control settings for the sixth filter switch, which corresponds to filter switch 1134-6, is defined as IN3, indicating that the third input port is to be coupled to the output of this filter switch. The other control setting for filter switch 1134-6, according to FIG. 14A, is $\lambda3$, so the $\lambda3$ wavelength channel of the optical signal appearing at the third input port is permitted to pass through this filter switch and subsequently dropped at drop port 1142-6. Consequently, it has been shown that ROADM 1100 can be configured to drop the same wavelength channel from two different input optical signals simultaneously at two different drop ports without collision or contention.

While the foregoing is directed to embodiments of the present invention, other and further embodiments of the invention may be devised without departing from the basic scope thereof, and the scope thereof is determined by the claims that follow. In particular, further embodiments of the present invention provide a reconfigurable optical device that includes only the optical add section of ROADM 1100 or only the optical drop section of ROADM 1100. In addition, such reconfigurable optical devices may be further simplified by removing the wavelength selective switches and primary splitters. A reconfigurable optical device without wavelength selective switches and primary splitters and having only the optical add section may be used to add channels in a reconfigurable manner to a WDM signal transmitted between two nodes in an optical communication system. Similarly, a reconfigurable optical device without wavelength selective switches and primary splitters and having only the optical drop section may be used to drop channels in a reconfigurable manner from a WDM signal transmitted between two nodes in an optical communication system.

We claim:

1. An optical device comprising:
   a plurality of optical filter switches;
   a plurality of splitters, each splitter coupled to each of the optical filter switches and configured to supply one or more wavelength channels from a wavelength division multiplexed (WDM) signal that is received at an input of the splitter to each of the optical filter switches; and
   a plurality of drop ports, each drop port coupled to a respective one of the optical filter switches, and each optical filter switch configurable to allow the one or more wavelength channels of the WDM signal supplied from each splitter to be directed to the coupled drop port.

2. The optical device of claim 1, wherein the optical filter switches each include a mirror that is rotatable about first and second axes.

3. The optical device of claim 2, wherein the mirror rotation about the first axis is controlled to select the wavelength channel and the mirror rotation about the second axis is controlled to select the splitter.

4. The optical device of claim 1, wherein the optical filter switches are configurable to allow the same wavelength channel from two different optical signals supplied respectively from any two splitters to be simultaneously directed to two different drop ports.

5. The optical device of claim 1, further comprising:
   a plurality of input ports, each of the input ports coupled to a respective one of the splitters to supply the WDM signal received at the input port to the input of the coupled splitter; and
   wavelength selective switches, each of which is coupled to a group of the splitters and an output port, and is configurable to allow one or more wavelength channels of the WDM signal supplied through one or more of the splitters in the group to be directed to the output port.

6. An optical device comprising:
   a plurality of add ports;
   a plurality of optical filter switches, each coupled to a respective one of the add ports; and
   a plurality of combiners, each combiner coupled to each of the optical filter switches and configured to receive one or more wavelength channels of a wavelength division multiplexed (WDM) signal from each of the optical filter switches and to generate a combined WDM signal;
   wherein each optical filter switch is configurable to allow the one or more wavelength channels of the WDM signal supplied through the coupled add port to be directed to one or more of the combiners.

7. The optical device of claim 6, wherein the optical filter switches each include a mirror that is rotatable about first and second axes.

8. The optical device of claim 7, wherein the mirror rotation about the first axis is controlled to select the wavelength channel and the mirror rotation about the second axis is controlled to select the combiner.

9. The optical device of claim 6, wherein the optical filter switches are configurable to allow a first wavelength channel from a first add port and a second wavelength channel from a second add port to be simultaneously directed to the same combiner.

10. The optical device of claim 6, wherein the optical filter switches are configurable to allow the same wavelength channel from the first and second add ports to be simultaneously directed to different combiners.

11. The optical device of claim 6, further comprising:
    a plurality of input ports; and
    wavelength selective switches, each of which is coupled to a group of the splitters and an output port, and is configurable to allow one or more wavelength channels of the WDM signal supplied through one or more of the splitters in the group to be directed to the output port; and
    wavelength selective switches, each of which has inputs coupled to a group of the splitters and one of the combiners and an output that is coupled to an output port, and is configurable to allow one or more wavelength channels of the WDM signal supplied through one or more of the inputs to be directed to the output.

* * * * *